(12) United States Patent
Kim et al.

(10) Patent No.: US 9,713,916 B2
(45) Date of Patent: Jul. 25, 2017

(54) TRANSFER METHOD OF MATERIALS BY USING PETROLEUM JELLY

(71) Applicant: KOREA INSTITUTE OF SCIENCE AND TECHNOLOGY, Seoul (KR)

(72) Inventors: Soo-Min Kim, Jeollabuk-do (KR); Joo-Song Lee, Jeollabuk-do (KR); Dong-Ick Son, Jeollabuk-do (KR); Seok-Hoon Ahn, Jeollabuk-do (KR); Myung-Jong Kim, Jeollabuk-do (KR); Se-Gyu Jang, Jeollabuk-do (KR); Hui-Su Kim, Jeollabuk-do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 14/991,158

(22) Filed: Jan. 8, 2016

(65) Prior Publication Data

US 2017/0001424 A1 Jan. 5, 2017

(30) Foreign Application Priority Data

Jul. 1, 2015 (KR) .................. 10-2015-0094375

(51) Int. Cl.
*B32B 37/00* (2006.01)
*B82Y 40/00* (2011.01)
*C01B 31/04* (2006.01)
*B82Y 30/00* (2011.01)
(Continued)

(52) U.S. Cl.
CPC ............ *B32B 37/025* (2013.01); *B82Y 30/00* (2013.01); *B82Y 40/00* (2013.01); *C01B 31/043* (2013.01); *C01B 31/0438* (2013.01); *B32B 38/10* (2013.01); *B32B 2037/246* (2013.01); *B32B 2313/04* (2013.01); *B32B 2457/14* (2013.01); *Y10T 156/10* (2015.01); *Y10T 428/30* (2015.01)

(58) Field of Classification Search
None
See application file for complete search history.

(56) References Cited

U.S. PATENT DOCUMENTS

| 6,669,801 B2 * | 12/2003 | Yoshimura .......... H01L 21/6835 156/230 |
| 8,906,245 B2 | 12/2014 | Ploss, Jr. |
| 2012/0021224 A1 | 1/2012 | Everett et al. |

(Continued)

FOREIGN PATENT DOCUMENTS

| CN | 104511402 A * | 4/2015 | .............. B05C 5/04 |
| JP | 2013-043820 A | 3/2013 | |

(Continued)

OTHER PUBLICATIONS

Li, Shisheng, et al. "Honeycomb-like single-wall carbon nanotube networks." *Journal Materials Chemistry A* 2.10 (2014): 3308-3311. (4 pages, in English).

*Primary Examiner* — Jiong-Ping Lu
(74) *Attorney, Agent, or Firm* — NSIP Law

(57) ABSTRACT

A method of transferring materials by using petroleum jelly is provided. An example of the method involves forming a material on a first substrate, forming a transfer support made from petroleum jelly on the material, removing the first substrate, stacking the material and the petroleum jelly transfer support after removing the first substrate on a second substrate, and removing the petroleum jelly transfer support.

7 Claims, 5 Drawing Sheets

(51) Int. Cl.
*B32B 38/10* (2006.01)
*B32B 37/24* (2006.01)

(56) References Cited

U.S. PATENT DOCUMENTS

2014/0087191 A1  3/2014  Chua et al.
2015/0314579 A1  11/2015  Hong et al.

FOREIGN PATENT DOCUMENTS

| JP | 2014-183167 A | 9/2014 |
| JP | 2014-525134 A | 9/2014 |
| KR | 10-1206352 B1 | 11/2012 |
| KR | 10-2014-0091374 A | 7/2014 |

\* cited by examiner

TRANSFER METHOD OF MATERIALS BY USING PETROLEUM JELLY

CROSS-REFERENCE TO RELATED APPLICATION(S)

This application claims the benefit under 35 USC 119(a) of Korean Patent Application No. KR 10-2015-0094375 filed on Jul. 1, 2015 in the Korean Intellectual Property Office, the entire disclosure of which is incorporated herein by reference for all purposes.

TECHNICAL FIELD

The present disclosure relates to a transfer method of materials by using petroleum jelly, including a material formation step of forming a material on a first substrate; a transfer support formation step of forming a transfer support made from petroleum jelly on the material; a first substrate removal step of removing the first substrate; a stacking step of stacking the material and the petroleum jelly transfer support after removing the first substrate on a second substrate; and a transfer support removal step of removing the petroleum jelly transfer support.

More particularly, the present disclosure relates to a method by which at least one material selected from the group consisting of graphene, graphene oxide, h-BN, $MoS_2$, $WS_2$, $MoS_2$, $WS_2$, $MoSe_2$, $WSe_2$, and carbon nanotubes is transferred onto a second substrate by using petroleum jelly (e.g., Vaseline®) as a transfer support without damage to the second substrate, the second substrate being any one selected from the group consisting of a flexible substrate, a conducting material, an insulating material, and a semiconducting material, and after the transfer, the petroleum jelly transfer support is easily removed.

BACKGROUND

Transfer technology that easily detaches and transfers a thin film with a two-dimensional structure, and strongly attaches the thin film to a desired substrate can be usefully used in various application fields, and generally, to transfer a thin film grown or strongly attached to a substrate onto another substrate, the substrate is removed to separate the thin film, or an adhesive is attached to achieve a stronger bond and then detached. To adhere the detached thin film to a desired substrate, physical (thermal or mechanical compression) methods are primarily used. However, these traditional methods damage or add parts of materials, so they have difficulty in making use of unique properties of the materials.

Such traditional technology is disclosed in Japanese Patent Publication No. 2013-043820A that uses a polymethylmethacrylate (PMMA) film and a PVA film as a transfer support of graphene for the purpose of a low cost and removes the used support using an organic solvent, U.S. Pat. No. 8,906,245B directed to a method of transferring PMMA-coated graphene from a source substrate to a target substrate, including rinsing with deionized water, scooping up with polymer such as sponge, and drying to remove impurities, and similar to these, traditional technology for transfer of a two-dimensional thin film is disclosed in Japanese Patent Publication No. 2014-525134A and Japanese Patent Publication No. 2014-183167A.

Furthermore, Korean Patent No. 1206352B discloses a fabrication method of a flexible substrate including the steps for spreading a carbon ink on a substrate to form a deposition layer, forming a graphene compound layer, and coating a coating solution thereon to form a thin film layer, thereby preventing the flexible substrate from curling.

Where a thin film with a two-dimensional structure is simply adhered through chemical treatment or by the Van der Waals force as disclosed, the adhesive strength with a target substrate is not too high, causing many future problems such as contamination and warping in the manufacture of a device or a component. Particularly, when a polymer material such as PMMA is used as a support for transfer, residues of the used polymer not only deteriorate the unique properties of graphene but also make a transfer step complex, and an additional pyrolysis process takes a long time to remove the residues, and especially, a flexible substrate based on a material with low heat resistance such as a polymer material cannot use a solvent or a pyrolysis process to remove the residues, so in practice, there are various procedural limit conditions.

RELATED LITERATURES

Patent Literature (Patent Literature 0001) Japanese Patent Publication No. 2013-043820A
(Patent Literature 0002) U.S. Pat. No. 8,906,245B
(Patent Literature 0003) Korean Patent No. 1206352B
(Patent Literature 0004) Japanese Patent Publication No. 2014-525134A
(Patent Literature 0005) Japanese Patent Publication No. 2014-183167A

DISCLOSURE

Technical Problem

The present disclosure is designed to solve the problem of the prior art, and therefore, the present disclosure is directed to providing a transfer method which is plainer and simpler and requires a shorter process time than traditional one in the transfer of a material including at least one selected from the group consisting of graphene, graphene oxide, h-BN, $MoS_2$, $WS_2$, $MoS_2$, $WS_2$, $MoSe_2$, $WSe_2$, and carbon nanotubes onto a substrate comprising any one selected from the group consisting of a flexible substrate, a conducting material, an insulating material, and a semiconducting material.

Further, the present disclosure is directed to providing a transfer method that removes support residues neatly without leaving behind in the transfer of the material onto the substrate.

Technical Solution

To achieve the objects, the present disclosure provides a transfer method of materials by using petroleum jelly, including a material formation step of forming a material on a first substrate, a transfer support formation step of forming a transfer support made from petroleum jelly on the material, a first substrate removal step of removing the first substrate, a stacking step of stacking the material and the petroleum jelly transfer support after removing the first substrate on a second substrate, and a transfer support removal step of removing the petroleum jelly transfer support.

In the transfer method of materials by using petroleum jelly according to an aspect of the present disclosure, the petroleum jelly may be a mixture of at least one selected from the group consisting of Vaseline, paraffin wax, microcrystalline petroleum wax, slack wax, ozokerite, lignite wax, and peat wax.

In the transfer method of materials by using petroleum jelly according to an aspect of the present disclosure, the first substrate may be any one selected from the group consisting of gold (Au), copper (Cu), iron (Fe), manganese (Mn), nickel (Ni), cobalt (Co), palladium (Pd), titanium (Ti), platinum (Pt), silver (Ag), tungsten (W), germanium (Ge), and silicon carbide (SiC).

In the transfer method of materials by using petroleum jelly according to an aspect of the present disclosure, the material may include at least one selected from the group consisting of graphene, graphene oxide, h-BN, $MoS_2$, $WS_2$, $MoS_2$, $WS_2$, $MoSe_2$, $WSe_2$, and carbon nanotubes. Also, the available material is not limited to particular form and size, and may be in the form of particles, rods, tubes, a thin film, and mixtures thereof. More preferably, the material may include at least one selected from a thin film with a two-dimensional structure made from graphene, graphene oxide, h-BN, $MoS_2$, $WS_2$, and carbon nanotubes, a thin film with a two-dimensional structure made from nanowires, and a composite thin film made from a combination of the thin film with a two-dimensional structure and nanoparticles.

In the transfer method of materials by using petroleum jelly according to an aspect of the present disclosure, the transfer support formation step may use any one transfer support formation method selected from spin coating and spray of the melted petroleum jelly, and hot spin coating performed concurrently with melting of the petroleum jelly.

The transfer method of materials by using petroleum jelly according to an aspect of the present disclosure may further include the step for freeze-drying a stack structure including the first substrate, the material, and the petroleum jelly transfer support formed after the transfer support formation step.

In the transfer method of materials by using petroleum jelly according to an aspect of the present disclosure, the first substrate removal step may include removing the first substrate using an acidic solution.

In the transfer method of materials by using petroleum jelly according to an aspect of the present disclosure, the second substrate may be any one selected from the group consisting of a flexible substrate, a conductive material, a dielectric material, and a semiconductor material.

In the transfer method of materials by using petroleum jelly according to an aspect of the present disclosure, the transfer support removal step may use an organic solvent.

Advantageous Effects

The present disclosure has advantages of being plainer and simpler and a shorter process time than traditional one and removing support residues neatly without leaving behind, by using petroleum jelly as a transfer support in the transfer of a material including at least one selected from the group consisting of graphene, graphene oxide, h-BN, $MoS_2$, $WS_2$, $MoS_2$, $WS_2$, $MoSe_2$, $WSe_2$, and carbon nanotubes onto a substrate comprising any one selected from the group consisting of a flexible substrate, a conducting material, an insulating material, and a semiconducting material.

Further, petroleum jelly used as the transfer support in the present disclosure typically goes by the brand name Vaseline, and because it is so inexpensive and environmentally friendly, does not get oxidized in the air, has chemical stability, and is found in solid state at room temperature but has a low melting point of about 37° C., it can perform additional functions such as stable support and anti-oxidation of a material to be transferred until a transfer process ends. Besides, because of having a relatively low melting temperature, it has an advantage of melting away a support using low energy, and has so high solubility in a hydrophobic organic solvent that it can be neatly removed without residues on the surface of a material even though a solvent is used.

DESCRIPTION OF EMBODIMENTS

Figure 1:
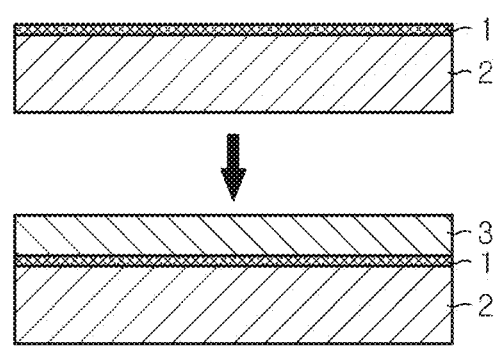
FIG. 1 is a conceptual diagram of the step for forming a petroleum jelly transfer support after forming graphene on a metal catalyst according to an aspect of the present disclosure.

Hereinafter, the present disclosure will be described in detail. It should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

The term 'petroleum jelly' as used herein is a purified mixture of saturated hydrocarbons obtained from petroleum jelly, and includes a compound called Vaseline, paraffin wax, microcrystalline petroleum wax, slack wax, ozokerite, lignite wax, peat wax, other mineral waxes, and similar products obtained by synthesis or by other processes, whether or not colored.

Petroleum jelly is unctuous to the touch, and white, yellow or dark brown in color, and is obtained from the residues of the distillation of certain crude petroleum oils or by mixing fairly high viscosity petroleum oils with such residues or by mixing paraffin wax or ceresin with a sufficiently refined mineral oil. Petroleum jelly includes the jelly, whether crude (sometimes called petrolatum), decolorized or refined. It also covers petroleum jelly obtained by synthesis. Generally, petroleum jelly as described herein satisfies the following condition. Petroleum jelly must have a congealing point, as determined by the rotating thermometer method (ASTM D 938), of not less than 30° C., a density at 70° C. of less than 0.942 g/cm$^3$. A Worked Cone Penetration at 25° C., as determined by the method ASTM D 217, of less than 350, a Cone Penetration at 25° C., as determined by the ASTM D 937 method, of not less than 80.

Paraffin wax contains by weight less than 0.75% of oil, and is a hydrocarbon wax extracted from certain distillates of petroleum oils or of oils obtained from shale or other bituminous minerals. This wax is translucent and white or yellowish in color, and has a relatively marked crystalline structure.

Microcrystalline petroleum wax is also a hydrocarbon wax. It is extracted from petroleum residues or from vacuum-distilled lubricating oil fractions. It is more opaque than paraffin wax and has a finer and less apparent crystalline structure. Normally it has a higher melting point than paraffin wax. It can vary from soft and plastic to hard and brittle and from dark brown to white in color.

Ozokerite is a natural mineral wax, and when purified, it is known as ceresin, and lignite (or montan) wax and the products known as montan pitch are ester waxes extracted from lignite. Ozokerite is hard in coarse state, and its color varies from brown to white after refining. Peat wax is physically/chemically similar to brown wax but is slightly softer.

Mineral wax (slack wax and scale wax) results from dewaxing of lubricating oils, and has a higher oil content and is less refined than paraffin wax, and its color varies from white to bright brown.

Petroleum jelly also includes products similar to those referred to above and obtained by synthesis or by any other process (for example, synthetic paraffin wax and synthetic microcrystalline wax).

Further, petroleum jelly as described herein includes higher polymer wax such as polyethylene wax, and includes artificial waxes obtained by the chemical modification of lignite wax or other mineral waxes, and mixtures, not emulsified or containing solvents, consisting of waxes mixed with animal waxes (including spermaceti), vegetable waxes or artificial waxes, and waxes mixed with fats, resins, mineral substances or other materials, provided they have a waxy character.

A transfer method of materials using petroleum jelly according to an aspect of the present disclosure includes a material formation step of forming a material on a first substrate; a transfer support formation step of forming a transfer support made from petroleum jelly on the material, a first substrate removal step of removing the first substrate, a stacking step of stacking the material and the petroleum jelly transfer support after removing the first substrate on a second substrate, and a transfer support removal step of removing the petroleum jelly transfer support.

First of all, a detailed description of the step for forming a material on a first substrate, and the step for forming a petroleum jelly transfer support on the formed material is provided as below.

The petroleum jelly may be a mixture of at least one selected from the group consisting of Vaseline, paraffin wax, microcrystalline petroleum wax, slack wax, ozokerite, lignite wax, and peat wax.

The first substrate according to an embodiment of the present disclosure may be a metal catalyst, the material may be graphene, and preferably, graphene may be grown by a chemical vapor deposition (CVD) method using a metal catalyst. More preferably, the first substrate may be any one selected from the group consisting of gold (Au), copper (Cu), iron (Fe), manganese (Mn), nickel (Ni), cobalt (Co), palladium (Pd), titanium (Ti), platinum (Pt), silver (Ag), tungsten (W), germanium (Ge), and silicon carbide (SiC).

Also, the material may include at least one selected from the group consisting of graphene, graphene oxide, h-BN, $MoS_2$, $WS_2$, $MoS_2$, $WS_2$, $MoSe_2$, $WSe_2$, and carbon nanotubes. The available material is not limited to particular form and size, and may be in the form of particles, rods, tubes, a thin film, and mixtures thereof. More preferably, the material may include at least one selected from a thin film with a two-dimensional structure made from graphene, graphene oxide, h-BN, $MoS_2$, $WS_2$, and carbon nanotubes, a thin film with a two-dimensional structure made from nanowires, and a composite thin film made from a combination of the thin film with a two-dimensional structure and nanoparticles.

The material to be transferred according to one embodiment of the present disclosure may be made by various methods, and as previously described, may be formed on the first substrate such as a metal catalyst by a CVD method, and may be formed by stacking a two-dimensional material on the first substrate, the two-dimensional material being at least one selected from a thin film with a two-dimensional structure made from graphene, graphene oxide, h-BN, $MoS_2$, $WS_2$, and carbon nanotubes, a thin film with a two-dimensional structure made from nanowires, and a composite thin film made from a combination of the thin film with a two-dimensional structure and nanoparticles, made by a variety of separate methods, and the first substrate is not limited thereto.

The transfer support formation step may use any one transfer support formation method selected from spin coating and spray of the melted petroleum jelly, and hot spin coating performed concurrently with melting of the petroleum jelly.

More preferably, the petroleum jelly transfer support may be formed by spin coating petroleum jelly heated at temperature above the melting temperature on the surface of the material, and in this instance, it is preferred to maintain a spin coater and the material on the first substrate at the temperature near the melting temperature of petroleum jelly.

The transfer method may further include the step for freeze-drying a stack structure including the first substrate, the material, and the petroleum jelly transfer support formed after the transfer support formation step.

The transfer method is described in more detail by referring to the accompanying drawings and the embodiments with an example of using petroleum jelly Vaseline as a transfer support and a typical two-dimensional material graphene as a material to be transferred.

FIG. 1 is a conceptual diagram of the step for forming a petroleum jelly transfer support after forming graphene on a metal catalyst according to an aspect of the present disclosure. Describing FIG. 1 according to an embodiment of the present disclosure, a material 1, for example, graphene is grown on a first substrate 2, for example, a metal catalyst using a CVD machine. A petroleum jelly transfer support 3 Vaseline in melted state is spin coated on the graphene formed on the metal catalyst to prepare a stack structure including of the metal catalyst, graphene, and Vaseline, and the prepared stack structure goes through a freeze-drying step and is placed in a desiccator to which nitrogen is supplied to remove other low molecular weight or volatile solvents included in Vaseline. The stack structure dried in the desiccator maintains solid state at room temperature below the melting temperature of Vaseline and acts as a transfer support, and is effective in preventing the material from oxidizing in the air and making the material chemically stable due to the hydrophobic property of Vaseline.

Hereinafter, a detailed description of the step for transferring the graphene through the step for removing the petroleum jelly transfer support after stacking the graphene and the petroleum jelly transfer support on a second substrate according to an aspect of the present disclosure is provided as below.

The first substrate removal step includes removing the first substrate using an acidic solution, the second substrate may be any one selected from the group consisting of a flexible substrate, a conductive material, a dielectric material, and a semiconductor material, and the transfer support removal step may use an organic solvent.

Figure 2:
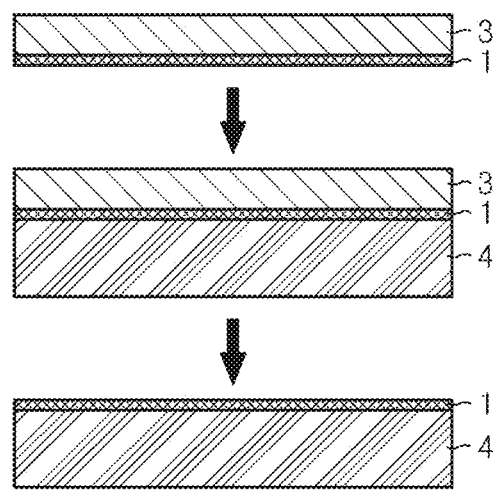
FIG. 2 is a conceptual diagram of the step for removing a petroleum jelly transfer support after stacking graphene and the petroleum jelly transfer support on a second substrate according to an aspect of the present disclosure.

FIG. 2 is a conceptual diagram of the step for removing the petroleum jelly transfer support after stacking the graphene and the petroleum jelly transfer support on the second substrate according to an aspect of the present disclosure. Describing FIG. 2 according to an embodiment of the present disclosure, the stack structure including the material 1 the graphene, the first substrate 2 the metal catalyst, and the petroleum jelly transfer support 3 Vaseline on the graphene formed on the metal catalyst is put in an acidic solution to remove a metal catalyst. The metal catalyst is removed by the acidic solution, while Vaseline serves to support the graphene and is not deformed by the acidic solution due to the hydrophobic property. The graphene is transferred by causing the stack structure of graphene and Vaseline to come into contact with the second substrate 4, for example, a 300 nm $SiO_2$/Si substrate, followed by immersion in a hydrophobic organic solvent such as benzene, toluene, dichloromethane, chlorofoam, diethylether, carbondisulfide and tetrahydrofuran to effectively remove the transfer support Vaseline.

Hereinafter, embodiments of the present disclosure will be described to specify the present disclosure in detail. However, the embodiments of the present disclosure may be modified in different forms and the scope of the present disclosure should not be construed as being limited to the embodiments set forth below. Rather, these embodiments are provided so that this disclosure will fully convey the scope of the present disclosure to one of ordinary skill in the art.

Example 1: Formation of Vaseline Transfer Support (see FIG. 1)

In the present disclosure, graphene prepared by a CVD method was used, and at a pre-processing step of a graphene growth method, a copper foil (100 m, Nilaco) is immersed in a nickel etchant and treated by a sonicator for about 2 minutes. Impurities remaining on the copper surface are removed by the nickel etchant, the copper foil is clearly washed with acetone and isopropanol, and after moisture is completely removed, the copper foil is placed in a CVD chamber. According to the graphene growth method, the pressure is reduced by a vacuum pump (total pressure 0.3 Torr), and the graphene is grown in the flow of methane ($CH_4$) of 8 sccm for 30 minutes at 10 sccm of hydrogen ($H_2$) under the temperature condition of 1025° C. The grown graphene is placed on a clean PET film, and to prevent Vaseline from permeating the lower surface, Scotch tape is attached to four edges about 1 mm Vaseline is heated at the temperature of 100° C.~160° C. into liquid, and dropped onto the graphene/copper foil/PET film having the attached Scotch tape, followed by spin coating (2500 rpm, 1 minute) to a form a Vaseline layer and drying in a desiccator.

Example 2: Formation of Vaseline Transfer Support (see FIG. 1)

The graphene growth condition of Example 2 is the same as that of Example 1, and the grown graphene is placed on a clean PET film, and to prevent Vaseline from permeating the lower surface, Scotch tape is attached to four edges about 1 mm Vaseline is heated at the temperature of 100° C.~160° C. into liquid, and dropped onto the graphene/copper foil/PET having the attached Scotch tape, followed by spin coating to a form a Vaseline layer and drying in a desiccator.

Example 3: Formation of Double-Layer Vaseline Transfer Support (see FIG. 1)

The graphene growth condition of Example 3 is the same as that of Example 1, and the grown graphene is placed on a clean PET film, and to prevent Vaseline from permeating the lower surface, Scotch tape is attached to four edges about 1 mm Vaseline is heated at the temperature of 100° C.~160° C. into liquid, and dropped onto the graphene/copper foil/PET having the attached Scotch tape, followed by spin coating to a form a Vaseline layer and drying in a desiccator.

2. Transfer of Graphene (see FIG. 2)

After the transfer support is formed, the Scotch tape part adhered to the edges of the resulting structure is cut off by scissors into transfer support/graphene/copper foil. The transfer support/graphene/copper foil is forced to float such that the copper foil part faces down and comes into contact with a copper etchant (CE-100), and copper is melted by the copper etchant while the transfer support/graphene remains. The transfer support/graphene is scooped up by a spoon like a solution, and a washing process is performed while floating the transfer support/graphene in a beaker containing distilled water multiple times. After the washing process is completed, the transfer support/graphene is forced to flow on a desired substrate ($SiO_2$/Si and a PET film), followed by dewetting in a desiccator.

The transfer support in contact with graphene is Vaseline, and the Examples 1 and 3 processes use one solvent selected from benzene, toluene, dichloromethane, chlorofoam, diethylether, carbondisulfide, THF, acetone, and ethyl acetate, and in the present disclosure, toluene was used. The toluene solvent is put in each of a conical flask and a beaker, and both are heated at 160° C. First washing is a process which gathers vapor from the solvent at the neck of the conical flask and melts Vaseline using the vapor, and second washing is a method which washes in the manner of immersing in the solvent heated in the beaker.

3. Analysis Result of Transferred Graphene

After the transfer, a graphene analysis method used analysis equipment, for example, OM (Eclipse LV150, Nikon), Raman (inVia Raman microscope, Renishaw), and AFM (N8-NEOS, Bruker, Germany) OM, Raman, and AFM measurement was performed on any part on the surface of the transferred graphene. OM is used to observe tears or impurities in the graphene at high magnification, Raman measurement is used to detect defects and quality of the graphene, and AFM measurement is used to detect tears or surface condition of the graphene.

Figure 3:
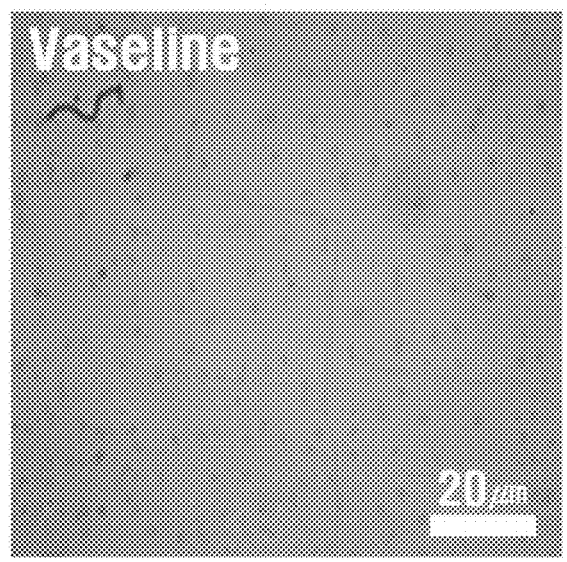
FIG. 3 is an image showing the surface of transferred graphene observed by an optical microscope when a single-layer Vaseline is used as a transfer support according to an embodiment of the present disclosure.

FIG. 3 is an image showing the surface of transferred graphene observed by an optical microscope when a single-layer Vaseline is used as a transfer support according to an embodiment of the present disclosure, and it can be seen that damage-free transfer of graphene is accomplished by a process using Vaseline.

Figure 4:
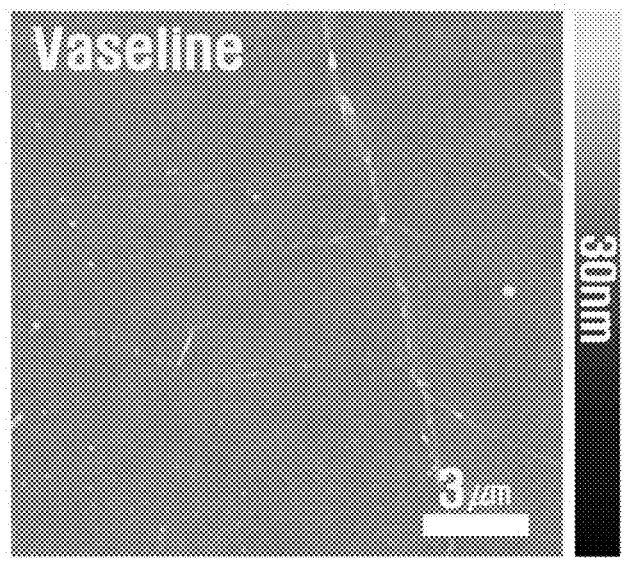
FIG. 4 is an image showing the surface of transferred graphene observed by an atomic force microscope (AFM) when a single-layer Vaseline is used as a transfer support according to an embodiment of the present disclosure.

FIG. 4 is an image showing the surface of transferred graphene observed by an atomic force microscope (AFM) when a single-layer Vaseline is used as a transfer support according to an embodiment of the present disclosure, and according to the AFM measurement results, it can be seen that transfer is achieved without micro-tears in the graphene, and there is no residue on the graphene surface.

Figure 5:
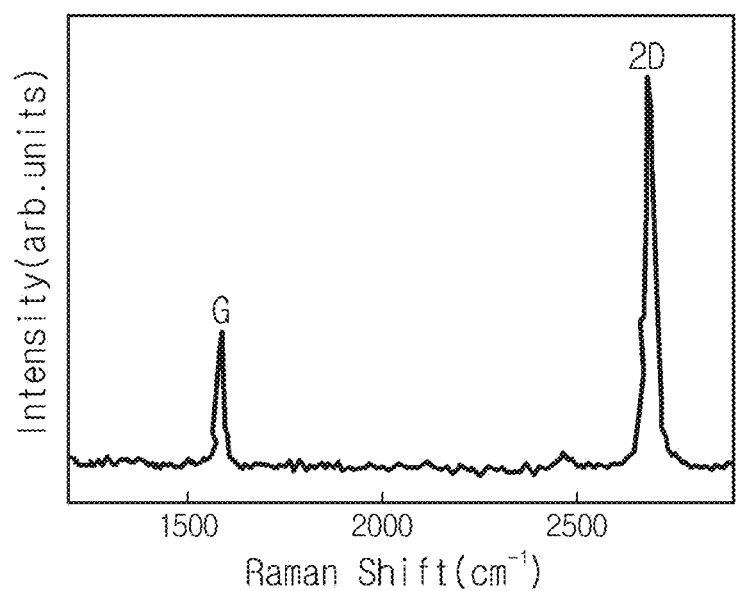
FIG. 5 shows a result of analyzing transferred graphene by Raman spectroscopy when a single-layer Vaseline is used as a transfer support according to an embodiment of the present disclosure.

FIG. 5 shows a result of analyzing transferred graphene by Raman spectroscopy when a single-layer Vaseline is used as a transfer support according to an embodiment of the present disclosure. The sample is identified as a graphene sample from the presence of G-band (~1590 cm$^{-1}$) that is thought of as a peculiar feature of graphene, and D-band (1350 cm$^{-1}$) representing defects in graphene is not seen, indicating that graphene is not damaged after transfer.

DESCRIPTION OF REFERENCE NUMERAL

1: material 2: first substrate 3: petroleum jelly transfer support 4: second substrate

What is claimed is:

1. A transfer method of materials by using petroleum jelly, comprising:
    a material formation step of forming a material on a first substrate;
    a transfer support formation step of forming a transfer support made from petroleum jelly on the material;
    a step for freeze-drying a stack structure comprising the first substrate, the material, and the petroleum jelly transfer support formed after the transfer support formation step;
    a first substrate removal step of removing the first substrate;
    a stacking step of stacking the material and the petroleum jelly transfer support after removing the first substrate on a second substrate; and
    a transfer support removal step of removing the petroleum jelly transfer support,
    wherein the transfer support formation step uses any one transfer support formation method selected from spin coating and spray of the melted petroleum jelly, and hot spin coating performed concurrently with melting of the petroleum jelly.

2. The transfer method of materials by using petroleum jelly according to claim 1, wherein the petroleum jelly is a mixture of at least one selected from the group consisting of paraffin wax, microcrystalline petroleum wax, slack wax, ozokerite, lignite wax, and peat wax.

3. The transfer method of materials by using petroleum jelly according to claim 1, wherein the first substrate is any one selected from the group consisting of gold (Au), copper (Cu), iron (Fe), manganese (Mn), nickel (Ni), cobalt (Co), palladium (Pd), titanium (Ti), platinum (Pt), silver (Ag), tungsten (W), germanium (Ge), and silicon carbide (SiC).

4. The transfer method of materials by using petroleum jelly according to claim 1, wherein the material includes at least one selected from the group consisting of graphene, graphene oxide, h-BN, MoS2, WS2, MoS2, WS2, MoSe2, WSe2, and carbon nanotubes.

5. The transfer method of materials by using petroleum jelly according to claim 1, wherein the first substrate removal step comprises removing the first substrate using an acidic solution.

6. The transfer method of materials by using petroleum jelly according to claim 1, wherein the second substrate is any one selected from the group consisting of a flexible substrate, a conductive material, a dielectric material, and a semiconductor material.

7. The transfer method of materials by using petroleum jelly according to claim 1, wherein the transfer support removal step uses an organic solvent.

* * * * *